(12) United States Patent
Lan et al.

(10) Patent No.: US 10,419,314 B2
(45) Date of Patent: Sep. 17, 2019

(54) METHOD, APPARATUS, AND SYSTEM FOR PACKET LOSS DETECTION

(71) Applicant: Huawei Technologies Co., Ltd., Shenzhen (CN)

(72) Inventors: Haiqing Lan, Shenzhen (CN); Jinli Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 15/387,289

(22) Filed: Dec. 21, 2016

(65) Prior Publication Data

US 2017/0104654 A1    Apr. 13, 2017

Related U.S. Application Data

(63) Continuation of application No. PCT/CN2014/080638, filed on Jun. 24, 2014.

(51) Int. Cl.
| | |
|---|---|
| *H04L 12/26* | (2006.01) |
| *H04L 12/801* | (2013.01) |
| *H04L 12/841* | (2013.01) |
| *H04L 27/26* | (2006.01) |

(52) U.S. Cl.
CPC ...... *H04L 43/0835* (2013.01); *H04L 43/0858* (2013.01); *H04L 47/12* (2013.01); *H04L 47/283* (2013.01); *H04L 27/2646* (2013.01); *H04L 27/2666* (2013.01); *H04L 47/11* (2013.01)

(58) Field of Classification Search
CPC .......... H04L 27/2646; H04L 27/2666; H04L 43/0835; H04L 43/0858; H04L 47/11; H04L 47/12; H04L 47/283
See application file for complete search history.

(56) References Cited

U.S. PATENT DOCUMENTS

| | | | | |
|---|---|---|---|---|
| 6,795,400 B1* | 9/2004 | Schick | ............... | H04L 41/5003 370/236 |
| 8,576,715 B2* | 11/2013 | Bloch | ............... | H04L 45/38 370/235 |
| 9,054,973 B2* | 6/2015 | Thaler | ............... | H04L 12/4625 |
| 2002/0136164 A1* | 9/2002 | Fukuda | ............... | H04L 47/10 370/230 |
| 2005/0123003 A1* | 6/2005 | Bordonaro | ............ | H04L 41/5009 370/516 |

(Continued)

FOREIGN PATENT DOCUMENTS

| | | |
|---|---|---|
| CN | 1647440 A | 7/2005 |
| CN | 101056260 A | 10/2007 |

(Continued)

*Primary Examiner* — Asad M Nawaz
*Assistant Examiner* — Kai Chang
(74) *Attorney, Agent, or Firm* — Leydig, Voit & Mayer, Ltd.

(57) ABSTRACT

A variation of a packet gap between packets sent from a source node and a packet gap between packets received by a destination node is determined; then an intensity of the packet gap variation is determined; and finally whether transmission congestion occurs between the source node and the destination node is determined according to the intensity of the packet gap variation. Therefore, accuracy of identifying a cause of a packet loss is improved, thereby avoiding impact of a transmission bit error.

20 Claims, 4 Drawing Sheets

(56) References Cited

U.S. PATENT DOCUMENTS

| | | | |
|---|---|---|---|
| 2005/0123033 A1 | 6/2005 | Pessoa et al. | |
| 2005/0207406 A1 | 9/2005 | Reme | |
| 2008/0259813 A1 | 10/2008 | Matta et al. | |
| 2009/0252053 A1* | 10/2009 | Leith | H04W 24/10 370/252 |
| 2013/0208593 A1* | 8/2013 | Nandagopal | H04L 47/00 370/232 |
| 2013/0215753 A1* | 8/2013 | Le Pallec | H04J 3/0667 370/235 |
| 2014/0003242 A1* | 1/2014 | Nadas | H04L 47/12 370/235 |
| 2014/0071817 A1* | 3/2014 | Chen | H04L 41/0645 370/229 |
| 2014/0164641 A1* | 6/2014 | Ye | H04L 47/127 709/235 |
| 2014/0192847 A1* | 7/2014 | Afkhami | H04L 27/2649 375/219 |
| 2014/0301225 A1* | 10/2014 | Palyi | H04L 47/11 370/252 |
| 2015/0350949 A1* | 12/2015 | Wang | H04W 16/14 370/230 |

FOREIGN PATENT DOCUMENTS

| | | |
|---|---|---|
| CN | 101582842 A | 11/2009 |
| CN | 101686100 A | 3/2010 |
| EP | 1168732 A1 | 1/2002 |
| JP | 2001230809 A | 8/2001 |
| JP | 2002118598 A | 4/2002 |
| JP | 2005110038 A | 4/2005 |
| JP | 2005523603 A | 8/2005 |

\* cited by examiner

METHOD, APPARATUS, AND SYSTEM FOR PACKET LOSS DETECTION

CROSS-REFERENCE TO RELATED APPLICATIONS

This application is a continuation of International Patent Application No. PCT/CN2014/080638, filed on Jun. 24, 2014, the disclosure of which is hereby incorporated by reference in its entirety.

TECHNICAL FIELD

Embodiments of the present invention relate to the field of communications technologies, and in particular, to a packet loss detection method, apparatus, and system.

BACKGROUND

In a modern communications system, packet or frame transmission is a common communications manner. Packet transmission aims at correctly sending a packet from a source communication node to a destination communication node. However, packet loss occurs in an intermediate transmission process because of various reasons. Generally, there are mainly the following two reasons for a packet loss. The first reason is transmission congestion, that is, a packet sending requirement exceeds a packet transmission capacity of a network. If the packet sending requirement is not reduced, a packet that cannot be sent may be discarded. The second reason is a transmission error, that is, the transmission error occurs in a processing process of intermediate packet transmission. As a result, the destination communication node may not receive a correct packet. For example, an intermediate transmission line is interfered, and an error occurs in some bits of a packet. The transmission error is caused by various reasons and causes an error in a part or all of bits. Therefore, this type of error may be collectively referred to as a transmission bit error.

A packet loss may impair a communication service, and therefore, the packet loss needs to be reduced. An indicator for evaluating severity of the packet loss is a packet loss rate. A packet loss rate caused by transmission congestion may be decreased by reducing a packet transmission rate by means of flow control over a packet, but a packet loss rate caused by a transmission bit error cannot be reduced by flow control over a packet. Therefore, a reason for a current packet loss needs to be identified.

In the prior art, a packet loss rate is obtained according to the number of packets sent from a source node and the number of packets received by a destination node. When the packet loss rate is greater than a set threshold, it is determined that transmission congestion occurs. When the packet loss rate is less than a set threshold, it is determined that transmission congestion does not occur. However, in the foregoing method, a packet loss caused by a transmission bit error may be mistakenly determined as a packet loss caused by transmission congestion. As a result, packet loss determining is inaccurate, thereby causing incorrect flow control, extremely low utilization of transmission bandwidth, and even service interruption.

SUMMARY

Embodiments of the present invention provide a packet loss detection method, device, and system, so as to solve a problem in the prior art that inaccuracy of packet loss determining causes incorrect traffic control, extremely low utilization of transmission bandwidth, and even service interruption.

According to a first aspect, an embodiment of the present invention provides a packet loss detection method, and the method includes:

determining a variation of a packet gap between packets sent from a source node and a packet gap between packets received by a destination node, where the packet gap variation is a variation of an interval, at which the destination node receives a packet, as compared to an interval at which the source node sends a packet;

determining intensity of the packet gap variation; and determining, according to the intensity of the packet gap variation, whether transmission congestion occurs between the source node and the destination node.

With reference to the first aspect, in a first implementation manner of the first aspect, the packet gap variation is a difference between a first gap and a second gap; the first gap is an gap between time when the destination node receives a first packet and time when the destination node receives a second packet; and the second gap is an gap between time when the source node sends the first packet and time when the source node sends the second packet.

With reference to the first implementation manner of the first aspect, in a second implementation manner of the first aspect, before the determining a variation of a packet gap between packets sent from a source node and a packet gap between packets received by a destination node, the method further includes:

receiving first time information sent from the source node and second time information sent from the destination node, where the first time information includes sending moments when the source node sends the first packet and the second packet, and the second time information includes receiving moments when the destination node receives the first packet and the second packet; or receiving first time information and second time information that are sent from the destination node, where the destination node acquires, from the received first packet sent from the source node, a sending moment when the source node sends the first packet, where the sending moment is carried in the first packet; and acquires, from the received second packet sent from the source node, a sending moment when the source node sends the second packet, where the sending moment is carried in the second packet.

With reference to the second implementation manner of the first aspect, in a third implementation manner of the first aspect, the determining a variation of a packet gap between packets sent from a source node and a packet gap between packets received by a destination node specifically includes:

determining the first gap according to the first time information, and determining the second gap according to the second time information; and determining the packet gap variation according to the first gap and the second gap.

With reference to the first implementation manner of the first aspect, in a fourth implementation manner of the first aspect, the gap variation is a difference between a first transmission delay and a second transmission delay; the first transmission delay is a delay between a moment when the destination node receives a third packet and a moment when the source node sends the third packet; and the second transmission delay is a delay between a moment when the destination node receives a fourth packet and a moment when the source node sends the fourth packet.

With reference to the fourth implementation manner of the first aspect, in a fifth implementation manner of the first aspect, before the determining a variation of a packet gap between packets sent from a source node and a packet gap between packets received by a destination node, the method further includes:

receiving the first transmission delay and the second transmission delay that are sent from the source node, where the destination node acquires, from the received third packet sent from the source node, a sending moment when the source node sends the third packet, where the sending moment is carried in the third packet; and acquires, from the received fourth packet sent from the source node, a sending moment when the source node sends the fourth packet, where the sending moment is carried in the fourth packet.

With reference to the fifth implementation manner of the first aspect, in a sixth implementation manner of the first aspect, the determining a variation of a packet gap between packets sent from a source node and a packet gap between packets received by a destination node specifically includes:

determining the packet gap variation according to the first transmission delay and the second transmission delay.

With reference to the fifth implementation manner of the first aspect, in a seventh implementation manner of the first aspect, before the determining a variation of a packet gap between packets sent from a source node and a packet gap between packets received by a destination node, the method further includes:

receiving the packet gap variation sent from the source node.

With reference to the first aspect, or any one of the first implementation manner to the seventh implementation manner, in an eighth implementation manner of the first aspect, the determining intensity of the packet gap variation specifically includes:

using an absolute value of a variation value of the packet gap variation, or according to a value of an even exponent of a variation value of the packet gap variation, as a discriminant value of the intensity of the packet gap variation.

With reference to the eighth implementation manner of the first aspect, in a ninth implementation manner of the first aspect, after the determining intensity of the packet gap variation, the method further includes:

performing filtering on the obtained discriminant value of the intensity according to $PGVT_i=(1-\alpha)*PGVT_{i-1}+\alpha*\Delta PG_i^2$, and obtaining a filtered discriminant value of the intensity, where $PGVT_i$ is the filtered discriminant value of the intensity; $PG_i$ is a variation value, obtained at a current time, of the packet gap variation; $PGVT_{i-1}$ is a discriminant value, obtained at a previous time, of the intensity; and $\Delta PG_i^2$ is a square of the packet gap variation obtained at the current time.

With reference to the ninth implementation manner of the first aspect, in a tenth implementation manner of the first aspect, the determining, according to the intensity of the packet gap variation, whether transmission congestion occurs between the source node and the destination node specifically includes:

if the discriminant value of the intensity is greater than or equal to a set threshold, determining that transmission congestion occurs between the source node and the destination node; or if the discriminant value of the intensity is less than a set threshold, determining that transmission congestion does not occur between the source node and the destination node.

With reference to the tenth implementation manner of the first aspect, in an eleventh implementation manner of the first aspect, after the determining, according to the intensity of the packet gap variation, whether transmission congestion occurs between the source node and the destination node, the method further includes:

in multiple times, which include a current time, of transmission congestion determining, if a determined probability of transmission congestion is greater than or equal to a set probability, finally determining that transmission congestion occurs between the source node and the destination node; or, if a determined probability of transmission congestion is less than a set probability, finally determining that transmission congestion does not occur between the source node and the destination node.

According to a second aspect, an embodiment of the present invention provides a packet loss detection apparatus, and the apparatus includes a memory and at least one processor, where:

the memory is configured to store an instruction; and the at least one processor is configured to run the instruction stored in the memory, so as to determine a variation of a packet gap between packets sent from a source node and a packet gap between packets received by a destination node, where the packet gap variation is a variation of an interval, at which the destination node receives the packet, as compared to an interval at which the source node sends the packet; determine intensity of the packet gap variation; and determine, according to the intensity of the packet gap variation, whether transmission congestion occurs between the source node and the destination node.

With reference to the second aspect, in a first implementation manner of the second aspect, the packet gap variation is a difference between a first gap and a second gap; the first gap is an gap between time when the destination node receives a first packet and time when the destination node receives a second packet; and the second gap is an gap between time when the source node sends the first packet and time when the source node sends the second packet.

With reference to the first implementation manner of the second aspect, in a second implementation manner of the second aspect, the apparatus further includes:

a transceiver, configured to: before the at least one processor determines the variation of the packet gap between the packets sent from the source node and the packet gap between the packets received by the destination node, receive first time information sent from the source node and second time information sent from the destination node, where the first time information includes sending moments when the source node sends the first packet and the second packet, and the second time information includes receiving moments when the destination node receives the first packet and the second packet; or receive first time information and second time information that are sent from the destination node, where the destination node acquires, from the received first packet sent from the source node, a sending moment when the source node sends the first packet, where the sending moment is carried in the first packet; and acquires, from the received second packet sent from the source node, a sending moment when the source node sends the second packet, where the sending moment is carried in the second packet.

With reference to the second implementation manner of the second aspect, in a third implementation manner of the second aspect, the at least one processor is specifically configured to run the instruction stored in the memory, so as to determine the first gap according to the first time information, and determine the second gap according to the second time information; and determine the packet gap variation according to the first gap and the second gap.

With reference to the first implementation manner of the second aspect, in a fourth implementation manner of the second aspect, the gap variation is a difference between a first transmission delay and a second transmission delay; the first transmission delay is a delay between a moment when the destination node receives a third packet and a moment when the source node sends the third packet; and the second transmission delay is a delay between a moment when the destination node receives a fourth packet and a moment when the source node sends the fourth packet.

With reference to the fourth implementation manner of the second aspect, in a fifth implementation manner of the second aspect, the transceiver is further configured to: before the at least one processor determines the variation of the packet gap between the packets sent from the source node and the packet gap between the packets received by the destination node, receive the first transmission delay and the second transmission delay that are sent from the source node, where the destination node acquires, from the received third packet sent from the source node, a sending moment when the source node sends the third packet, where the sending moment is carried in the third packet; and acquires, from the received fourth packet sent from the source node, a sending moment when the source node sends the fourth packet, where the sending moment is carried in the fourth packet.

With reference to the fifth implementation manner of the second aspect, in a sixth implementation manner of the second aspect, the at least one processor is specifically configured to run the instruction stored in the memory so as to determine the packet gap variation according to the first transmission delay and the second transmission delay.

With reference to the fifth implementation manner of the second aspect, in a seventh implementation manner of the second aspect, the transceiver is further configured to: before the at least one processor determines the variation of the packet gap between the packets sent from the source node and the packet gap between the packets received by the destination node, receive the packet gap variation sent from the source node.

With reference to the second aspect, or any one of the first implementation manner to the seventh implementation manner, in an eighth implementation manner of the second aspect, the at least one processor is specifically configured to run the instruction stored in the memory so as to use an absolute value of a variation value of the packet gap variation, or according to a value of an even exponent of a variation value of the packet gap variation, as a discriminant value of the intensity of the packet gap variation.

With reference to the eighth implementation manner of the second aspect, in a ninth implementation manner of the second aspect, after determining the intensity of the intensity of the packet gap variation, the at least one processor is further configured to run the instruction stored in the memory, so as to perform filtering on the obtained discriminant value of the intensity according to $PGVT_i = (1-\alpha)*PGVT_{i-1} + \alpha*\Delta PG_i^2$, and obtain a filtered discriminant value of the intensity, where $PGVT_i$ is the filtered discriminant value of the intensity; $PG_i$ is a variation value, obtained at a current time, of the packet gap variation; $PGVT_{i-1}$ is a discriminant value, obtained at a previous time, of the intensity; and $\Delta PG_i^2$ is a square of the packet gap variation obtained at the current time.

With reference to the ninth implementation manner of the second aspect, in a tenth implementation manner of the second aspect, the at least one processor is specifically configured to run the instruction stored in the memory, and if the discriminant value of the intensity is greater than or equal to a set threshold, determine that transmission congestion occurs between the source node and the destination node; or if the discriminant value of the intensity is less than the set threshold, determine that transmission congestion does not occur between the source node and the destination node.

With reference to the tenth implementation manner of the second aspect, in an eleventh implementation manner of the second aspect, after determining, according to the intensity of the packet gap variation, whether transmission congestion occurs between the source node and the destination node, the at least one processor is further configured to run the instruction stored in the memory, and in multiple times, which include a current time, of transmission congestion determining, if a determined probability of transmission congestion is greater than or equal to a set probability, finally determine that transmission congestion occurs between the source node and the destination node;

or, if a determined probability of transmission congestion is less than a set probability, finally determine that transmission congestion does not occur between the source node and the destination node.

According to a third aspect, an embodiment of the present invention further provides a packet loss detection system, and the system includes a source node, a destination node, and the packet loss detection apparatus provided in the foregoing second aspect or any implementation manner of the second aspect.

With reference to the third aspect, in a first implementation manner of the third aspect, the packet loss detection apparatus is the source node, the destination node, a device in a transport network between the source node and the destination node, or a device outside the transport network.

According to a packet loss detection method, device, and system provided in embodiments of the present invention, a variation of a packet gap between packets sent from a source node and a packet gap between packets received by a destination node is determined; then intensity of the packet gap variation is determined; and finally whether transmission congestion occurs between the source node and the destination node is determined according to the intensity of the packet gap variation. Therefore, accuracy of identifying a cause of a packet loss is improved, thereby avoiding impact of a transmission bit error. When transmission congestion occurs between the source node and the destination node, transmission traffic can be controlled in time to reduce a packet sending rate of the source node, thereby reducing a packet loss rate and improving utilization of transmission bandwidth.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
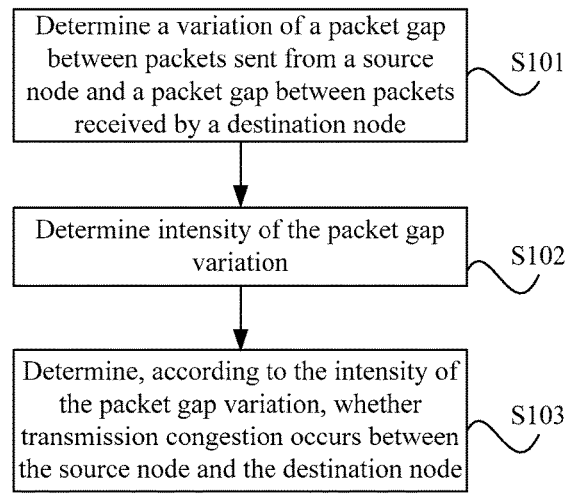
FIG. 1 is a flowchart of an embodiment of a packet loss detection method according to the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM, Global System for Mobile communications), a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access Wireless) system, a Frequency Division Multiple Access (FDMA, Frequency Division Multiple Addressing) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and may be a conventional wired network such as an IP network and Ethernet, and other communications systems.

A node involved in this specification may be a wireless network device or a wired network device of various types, such as a terminal, a base station, and an access point.

A terminal involved in the present application, that is, a user equipment, may be a wireless terminal or a wired terminal, where the wireless terminal may refer to a device that provides voice and/or data connectivity for a user, a handheld device capable of wireless connection, or other processing devices connected to a wireless modem. The wireless terminal may communicate with one or more core networks through a radio access network (for example, RAN, Radio Access Network). The wireless terminal may be a mobile terminal, such as a mobile phone (which may also be referred to as a "cellular" phone), a computer having a mobile terminal, for example, a portable, pocket-sized, handheld, computer built-in, or vehicle-mounted mobile apparatus, which exchange voice and/or data with the radio access network. For example, it may be a device such as a personal communication service (PCS, Personal Communication Service) phone, a cordless telephone set, a session initiation protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station, a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

A base station may refer to a device, in an access network, that communicates with a wireless terminal by using one or more sectors on an air interface. The base station may be used to mutually convert a received over-the-air frame and an IP packet and serve as a router between the wireless terminal and the rest portion of the access network, where the rest portion of the access network may include an Internet Protocol (IP) network. The base station may also coordinate attribute management of the air interface. For example, the base station may be a base transceiver station (BTS, Base Transceiver Station) in GSM or CDMA, may also be a NodeB (NodeB) in WCDMA, and may further be an evolved NodeB in LTE, which is not limited in the present application.

A base station controller may be a base station controller (BSC, base station controller) in GSM or CDMA, or a radio network controller (RNC, Radio Network Controller) in WCDMA, which is not limited in the present application.

An access network device may be a network element such as an access point (Access Point, AP) in WLAN, a base transceiver station (Base Transceiver Station, BTS) in a GSM network, a GPRS network, or a CDMA network, a NodeB (NodeB) in a CDMA2000 network or a WCDMA network, an evolved NodeB (Evolved NodeB, eNB) in an LTE network, or an access service network base station (Access Service Network Base Station, ASN BS) in a WiMAX network; or may also be a network element such as the foregoing access point, a controller behind the base station, or an authenticator.

FIG. 1 is a flowchart of an embodiment of a packet loss detection method according to the present invention. As shown in FIG. 1, the method includes:

S101. Determine a variation of a packet gap between packets sent from a source node and a packet gap between packets received by a destination node, where the packet gap variation is a variation of an interval, at which the destination node receives a packet, as compared to an gap at which the source node sends a packet.

S102. Determine intensity of the packet gap variation.

S103. Determine, according to the intensity of the packet gap variation, whether transmission congestion occurs between the source node and the destination node.

The foregoing steps may be performed on a source node side or a destination node side, and may also be performed on another node in addition to the source node and the destination node; or the foregoing steps may further be performed by a network device in a transport network between the source node and the destination node, and may also be performed on an server independently deployed outside the transport network. The foregoing manners set no limitation on the present invention.

As a feasible implementation manner, the packet gap variation may be a difference between a first gap and a second gap, where the first gap is an gap between time when the destination node receives a first packet and time when the destination node receives a second packet, and the second gap is an gap between time when the source node sends the first packet and time when the source node sends the second packet. Optionally, the first packet and the second packet may be packets adjacent to each other, or packets with a relatively short gap, which is certainly not considered as a limitation on the present invention.

As another feasible implementation manner, the gap variation may further be a difference between a first transmission delay and a second transmission delay, where the first transmission delay is a delay between a moment when the destination node receives a third packet and a moment when the source node sends the third packet, and the second transmission delay is a delay between a moment when the destination node receives a fourth packet and a moment when the source node sends the fourth packet. Optionally, the third packet and the fourth packet may be packets adjacent to each other, or packets with a relatively short gap, which is certainly not considered as a limitation on the present invention.

Figure 2:
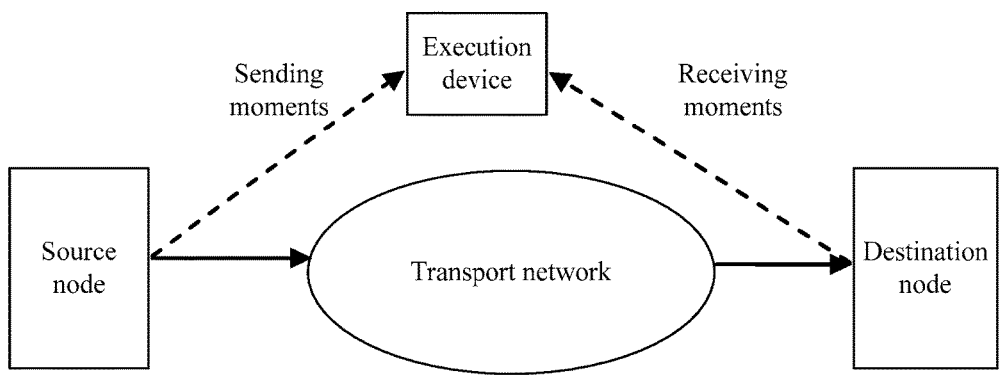
FIG. 2 is a schematic interaction diagram of devices involved in an embodiment of a packet loss detection method according to the present invention.

In the implementation manner in which the packet gap variation is the difference between the first gap and the second gap, as a feasible implementation manner, a method execution device for the foregoing steps may receive first time information sent from the source node and second time information sent from the destination node, where the first time information includes sending moments when the source node sends the first packet and the second packet, and the second time information includes receiving moments when the destination node receives the first packet and the second packet. As shown in FIG. 2, that is, the source node sends packet sending moment information to the foregoing method execution device, and the destination node sends packet receiving moment information to the foregoing method execution device. Therefore, the foregoing method execution device may determine the first gap according to the first time information, and determine the second gap according to the second time information; and further determine the packet gap variation according to the first gap and the second gap.

Figure 3:
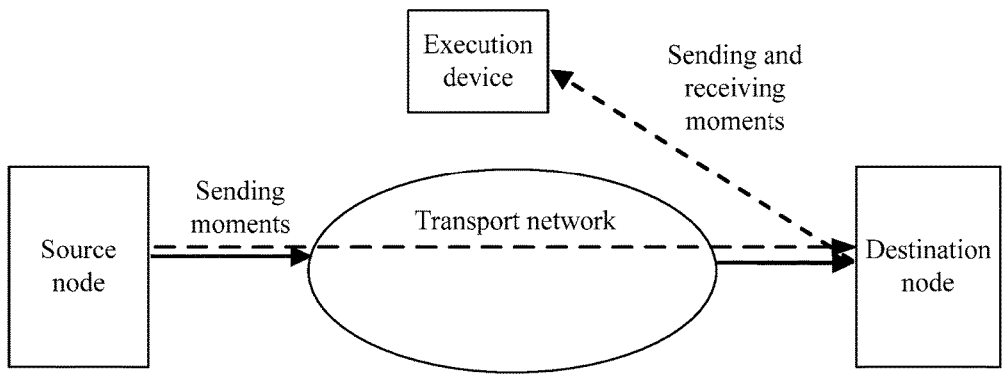
FIG. 3 is a schematic interaction diagram of devices involved in another embodiment of a packet loss detection method according to the present invention.

In the implementation manner in which the packet gap variation is the difference between the first gap and the second gap, as another feasible implementation manner, a method execution device for the foregoing steps may receive first time information and second time information that are sent from the destination node. The destination node acquires, from the received first packet sent from the source node, a sending moment when the source node sends the first packet, where the sending moment is carried in the first packet; and acquires, from the received second packet sent from the source node, a sending moment when the source node sends the second packet, where the sending moment is carried in the second packet. As shown in FIG. 3, the source node may carry sending moment information in the first packet and also carry sending moment information in the second packet. Therefore, the destination node may send the first time information and the second time information to the execution device. Similarly, the foregoing method execution device may determine the first gap according to the first time information, and determine the second gap according to the second time information; and further determine the packet gap variation according to the first gap and the second gap.

Figure 4:
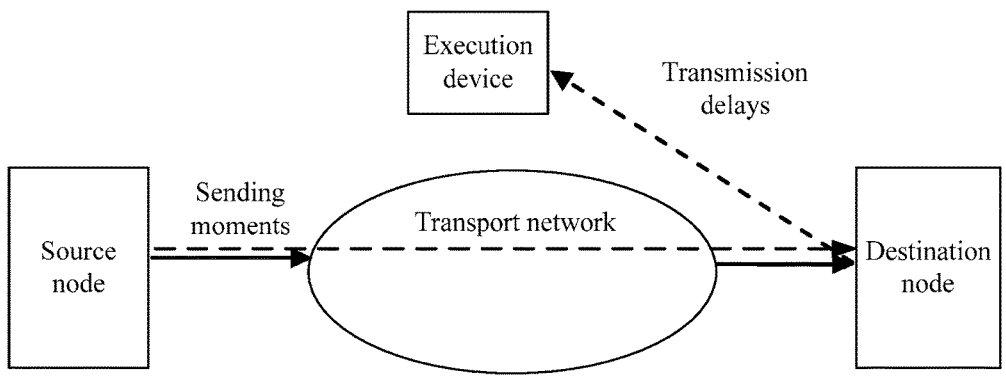
FIG. 4 is a schematic interaction diagram of devices involved in still another embodiment of a packet loss detection method according to the present invention.

In the implementation manner in which the packet gap variation is the difference between the first transmission delay and the second transmission delay, as a feasible implementation manner, an execution device may receive the first transmission delay and the second transmission delay that are sent from the destination node. The destination node acquires, from the received third packet sent from the source node, a sending moment when the source node sends the third packet, where the sending moment is carried in the third packet; and acquires, from the received fourth packet sent from the source node, a sending moment when the source node sends the fourth packet, where the sending moment is carried in the fourth packet. As shown in FIG. 4, the source node may add sending moment information to the third packet, and also add sending moment information to the fourth packet. The destination node calculates the first transmission delay according to the sending moment and the receiving moment of the third packet, calculates the second transmission delay according to the sending moment and the receiving moment of the fourth packet, and sends the first transmission delay and the second transmission delay to the foregoing execution device. Therefore, the foregoing execution device may determine the packet gap variation according to the first transmission delay and the second transmission delay.

Figure 5:
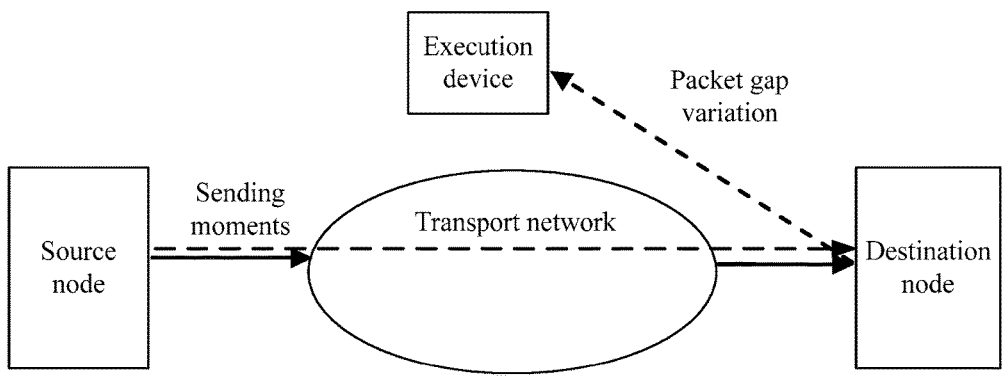
FIG. 5 is a schematic interaction diagram of devices involved in still another embodiment of a packet loss detection method according to the present invention.

In the implementation manner in which the packet gap variation is the difference between the first transmission delay and the second transmission delay, as another feasible implementation manner, an execution device may receive the packet gap variation sent from the destination node. As shown in FIG. 5, the source node may add sending moment information to the third packet, and also add sending moment information to the fourth packet. The destination node calculates the first transmission delay according to the sending moment and the receiving moment of the third packet, calculates the second transmission delay according to the sending moment and the receiving moment of the fourth packet, and further calculates the packet gap variation and sends the packet gap variation to the foregoing execution device.

After the packet gap variation is calculated, the intensity of the packet gap variation may further be determined. It should be noted that the packet gap variation may be a positive value, and may also be a negative value. In order to measure the intensity of a packet gap variation, generally a non-negative value may be used. Therefore, the intensity of the packet gap variation may be determined by using a function of the packet gap variation.

That is, PGVT=f ($\Delta$PG), where $\Delta$PG indicates the packet gap variation and PGVT indicates the intensity of the packet gap variation. The function f converts the $\Delta$PG into a non-negative indicator, and the function may have multiple solutions, which are not limited in the present invention. Optionally, an absolute value or an even exponent of the $\Delta$PG may be obtained. For example, the intensity of the packet gap variation may be calculated by using a square of the $\Delta$PG, and an obtained result is referred to as a discriminant value of the intensity.

Further, it can be determined, according to the discriminant value of the intensity, whether transmission congestion occurs between the source node and the destination node.

Specifically, if the discriminant value of the intensity is greater than or equal to a set threshold, it can be determined that transmission congestion occurs between the source node and the destination node; or if the discriminant value of the intensity is less than a set threshold, it can be determined that transmission congestion does not occur between the source node and the destination node.

According to a packet loss detection method provided in this embodiment, a variation of a packet gap between packets sent from a source node and a packet gap between packets received by a destination node is determined; then intensity of the packet gap variation is determined; and finally whether transmission congestion occurs between the source node and the destination node is determined according to the intensity of the packet gap variation. Therefore, accuracy of identifying a cause of a packet loss is improved, thereby avoiding impact of a transmission bit error. When transmission congestion occurs between the source node and the destination node, transmission traffic can be controlled in time to reduce a packet sending rate of the source node, thereby reducing a packet loss rate and improving utilization of transmission bandwidth.

In another embodiment of a packet loss detection method provided in the present invention and on the basis of the embodiment shown in FIG. 1, the method includes:

S201. Determine a variation of a packet gap between packets sent from a source node and a packet gap between packets received by a destination node, where the packet gap variation is a variation of an interval, at which the destination node receives a packet, as compared to an interval at which the source node sends a packet.

S202. Determine intensity of the packet gap variation.

S203. Perform filtering on an obtained discriminant value of the intensity, and obtain a filtered discriminant value of the intensity.

S204. Determine, according to the intensity of the packet gap variation, whether transmission congestion occurs between the source node and the destination node.

On the basis of the embodiment shown in FIG. 1, after the intensity of the packet gap variation is determined, interference caused by various reasons may be reduced in this embodiment.

In network transmission, a packet gap variation may occur because of various reasons. For example, packets simultaneously arrive at multiple ingress ports of an intermediate transmission node and are sent from a same egress port, which may cause a packet gap variation. Therefore, optionally, filtering may be performed on the obtained discriminant value of the intensity to obtain the filtered discriminant value of the intensity. For example, an Alpha filtering method may be used.

Specifically, filtering is performed on the obtained discriminant value of the intensity according to $PGVT_i = (1-\alpha)*PGVT_{i-1} + \alpha*\Delta PG_i^2$, where $PGVT_i$ is the filtered discriminant value of the intensity; $PG_i$ is a variation value, obtained at a current time, of the packet gap variation; $PGVT_{i-1}$ is a discriminant value, obtained at a previous time, of the intensity; and $\Delta PG_i^2$ is a square of the packet gap variation obtained at the current time.

According to a packet loss detection method provided in this embodiment, a variation of a packet gap between packets sent from a source node and a packet gap between packets received by a destination node is determined, and then intensity of the packet gap variation is determined. Further, filtering may be performed on an obtained discriminant value of the intensity by using a filtering method, and then whether transmission congestion occurs between the source node and the destination node is determined according to filtered intensity of the packet gap variation. Therefore, accuracy of identifying a cause of a packet loss is improved, thereby avoiding impact of a transmission bit error. When transmission congestion occurs between the source node and the destination node, transmission traffic can be controlled in time to reduce a packet sending rate of the source node, thereby reducing a packet loss rate and improving utilization of transmission bandwidth. Because filtering is performed on the discriminant value of the intensity of the packet gap variation, impact caused by interference on the packet gap variation is reduced.

In still another embodiment of a packet loss detection method provided in the present invention, on the basis of FIG. 1 and the foregoing embodiment, the method includes:

S201. Determine a variation of a packet gap between packets sent from a source node and a packet gap between packets received by a destination node, where the packet gap variation is a variation of an interval, at which the destination node receives a packet, as compared to an interval at which the source node sends a packet.

S202. Determine intensity of the packet gap variation.

S203. Perform filtering on an obtained discriminant value of the intensity, and obtain a filtered discriminant value of the intensity.

S204. Determine, according to the intensity of the packet gap variation, whether transmission congestion occurs between the source node and the destination node.

S205. In multiple times, which include a current time, of transmission congestion determining, if a determined probability of transmission congestion is greater than or equal to a set probability, finally determine that transmission congestion occurs between the source node and the destination node; or if a determined probability of transmission congestion is less than a set probability, finally determine that transmission congestion does not occur between the source node and the destination node.

Accuracy of determining a transmission congestion state is affected by various factors, such as the interference on the packet gap variation mentioned in the foregoing embodiment, and may further be affected by a value of a set threshold for determining the discriminant value of the intensity. Therefore, on the basis of the foregoing FIG. 1 and the foregoing embodiment, in this embodiment, a determining result of S204 is further corrected in a probability statistics manner.

For example, multiple times of transmission congestion determining are performed in a manner of S101-S103 in the embodiment shown in FIG. 1; or multiple times of transmission congestion determining are performed in a manner of S201-S204 in the foregoing embodiment. Optionally, in the foregoing multiple times of determining, if a determined probability of transmission congestion is greater than or equal to a set probability, it may finally be determined that transmission congestion occurs between the source node and the destination node; or if a determined probability of transmission congestion is less than a set probability, it may finally be determined that transmission congestion does not occur between the source node and the destination node.

According to a packet loss detection method provided in this embodiment, a variation of a packet gap between packets sent from a source node and a packet gap between packets received by a destination node is determined, and then intensity of the packet gap variation is determined. Further, filtering may be performed on an obtained discriminant value of the intensity by using a filtering method, and then whether transmission congestion occurs between the source node and the destination node is determined according to filtered intensity of the packet gap variation. Therefore, accuracy of identifying a cause of a packet loss is improved, thereby avoiding impact of a transmission bit error. When transmission congestion occurs between the source node and the destination node, transmission traffic can be controlled in time to control a packet sending rate of the source node, thereby reducing a packet loss rate. Because filtering is performed on the discriminant value of the intensity of the packet gap variation, impact caused by interference on the packet gap variation is reduced, and utilization of transmission bandwidth is improved. Further, because probabilities obtained by multiple times of transmission congestion determining are comprehensively considered to finally determine whether transmission congestion occurs between the source node and the destination node, accuracy of transmission congestion determining is further improved.

Figure 6:
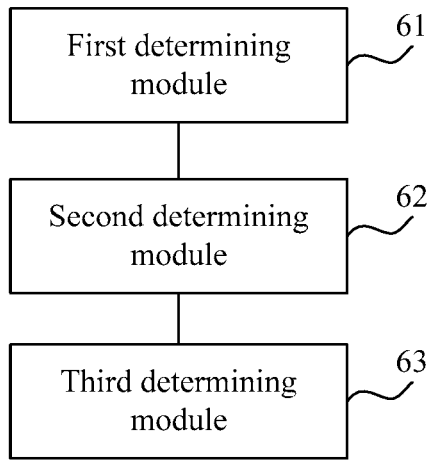
FIG. 6 is a schematic structural diagram of an embodiment of a packet loss detection apparatus according to the present invention.
Figure 7:
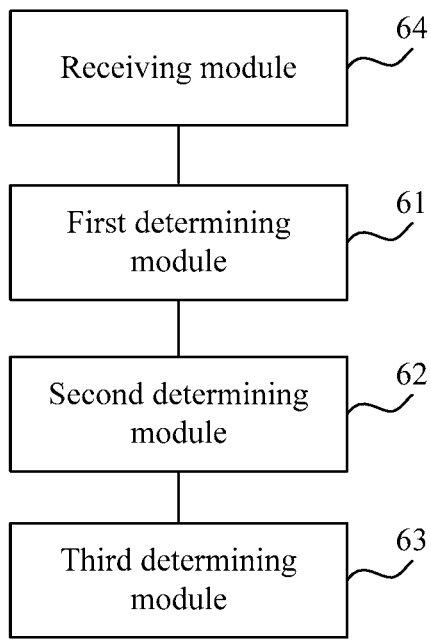
FIG. 7 is a schematic structural diagram of another embodiment of a packet loss detection apparatus according to the present invention.

Packet loss detection apparatuses provided in FIG. 6 and FIG. 7 are corresponding to a packet loss detection method provided in the present invention, and are execution devices of the method. The packet loss detection apparatuses may be a source node or a destination node in a network, and may also be another node in addition to the source node and the destination node; or may further be a network device in a transport network between the source node and the destination node, and may also be a server independently deployed outside the transport network; or may further be a function module in the node, the device, or the server enumerated in the foregoing description. It should be noted that functions of various modules shown in FIG. 6 and FIG. 7 may be implemented in the foregoing devices by using software; or may further be implemented by using an integrated circuit, and this type of integrated circuit may have a signal input port and a signal output port, and various functional circuits. Functions of a first determining module 61, a second determining module 62, and a third determining module 63 involved in FIG. 6 and FIG. 7 may be implemented by using the functional circuits in the integrated circuit. A function of a receiving module 64 may be implemented by using the input port and/or output port in the integrated circuit. FIG. 6 is a schematic structural diagram of an embodiment of a packet loss detection apparatus according to the present invention. The apparatus provided in this embodiment is corresponding to the method provided in the embodiment shown in FIG. 1 to FIG. 5, and is an execution device of the method embodiment. As shown in FIG. 6, the apparatus includes:

the first determining module 61, configured to determine a variation of a packet gap between packets sent from a source node and a packet gap between packets received by a destination node, where the packet gap variation is a variation of an interval, at which the destination node receives a packet, as compared to an interval at which the source node sends a packet;

the second determining module 62, configured to determine intensity of the packet gap variation; and the third determining module 63, configured to determine, according to the intensity of the packet gap variation, whether transmission congestion occurs between the source node and the destination node.

The foregoing first determining module 61, second determining module 62, and third determining module 63 may be different modules independent of each other, and may also be a same module.

Optionally, the packet gap variation is a difference between a first gap and a second gap, where the first gap is an gap between time when the destination node receives a first packet and time when the destination node receives a second packet, and the second gap is an gap between time when the source node sends the first packet and time when the source node sends the second packet.

FIG. 7 is a schematic structural diagram of another embodiment of a packet loss detection apparatus according to the present invention. The apparatus provided in this embodiment is corresponding to each method embodiment provided in the present invention, and is an execution device of the method embodiments. As shown in FIG. 7, on the basis of the apparatus shown in FIG. 6, the apparatus in this embodiment further includes:

the receiving module 64, configured to: before the first determining module determines the variation of the packet gap between the packets sent from the source node and the packet gap between the packets received by the destination node, receive first time information sent from the source node and second time information sent from the destination node, where the first time information includes sending moments when the source node sends the first packet and the second packet, and the second time information includes receiving moments when the destination node receives the first packet and the second packet; or receive first time information and second time information that are sent from the destination node, where the destination node acquires, from the received first packet sent from the source node, a sending moment when the source node sends the first packet, where the sending moment is carried in the first packet; and acquires, from the received second packet sent from the source node, a sending moment when the source node sends the second packet, where the sending moment is carried in the second packet.

Optionally, the first determining module 61 is specifically configured to determine the first gap according to the first time information, and determine the second gap according to the second time information; and determine the packet gap variation according to the first gap and the second gap.

Optionally, the gap variation is a difference between a first transmission delay and a second transmission delay, where the first transmission delay is a delay between a moment when the destination node receives a third packet and a moment when the source node sends the third packet, and the second transmission delay is a delay between a moment when the destination node receives a fourth packet and a moment when the source node sends the fourth packet.

Optionally, the receiving module 64 is further configured to: before the first determining module determines the variation of the packet gap between the packets sent from the source node and the packet gap between the packets received by the destination node, receive the first transmission delay and the second transmission delay that are sent from the source node, where the destination node acquires, from the received third packet sent from the source node, a sending moment when the source node sends the third packet, where the sending moment is carried in the third packet; and acquires, from the received fourth packet sent from the source node, a sending moment when the source node sends the fourth packet, where the sending moment is carried in the fourth packet.

Optionally, the first determining module 61 may be specifically configured to determine the packet gap variation according to the first transmission delay and the second transmission delay.

Optionally, the receiving module 64 may further be configured to: before the first determining module determines the variation of the packet gap between the packets sent from the source node and the packet gap between the packets received by the destination node, receive the packet gap variation sent from the source node.

Optionally, the second determining module 62 may be specifically configured to use an absolute value of a variation value of the packet gap variation, or according to a value of an even exponent of a variation value of the packet gap variation, as a discriminant value of the intensity of the packet gap variation.

Optionally, after determining the intensity of the packet gap variation, the second determining module 62 is further configured to perform filtering on the obtained discriminant value of the intensity according to $PGVT_i = (1-\alpha) * PGVT_{i-1} + \alpha * \Delta PG_i^2$, and obtain a filtered discriminant value of the intensity, where $PGVT_i$ is the filtered discriminant value of the intensity; $PG_i$ is a variation, obtained at a current time, of the packet gap variation; $PGVT_{i-1}$ is a discriminant value, obtained at a previous time, of the intensity; and $\Delta PG_i^2$ is a square of the packet gap variation obtained at the current time.

Optionally, the third determining module 63 is specifically configured to: if the discriminant value of the intensity is greater than or equal to a set threshold, determine that transmission congestion occurs between the source node and the destination node; or if the discriminant value of the intensity is less than a set threshold, determine that transmission congestion does not occur between the source node and the destination node.

Optionally, after determining, according to the intensity of the packet gap variation, whether transmission congestion occurs between the source node and the destination node, the third determining module 63 is further configured to: in multiple times, which include a current time, of transmission congestion determining, if a determined probability of transmission congestion is greater than or equal to a set probability, finally determine that transmission congestion occurs between the source node and the destination node; or if a determined probability of transmission congestion is less than a set probability, finally determine that transmission congestion does not occur between the source node and the destination node.

For a specific process and effects of the packet loss detection method performed by the packet loss detection apparatuses provided in FIG. 6 and FIG. 7, refer to related descriptions in each method embodiment provided in the present invention. Details are not described herein again.

Figure 8:
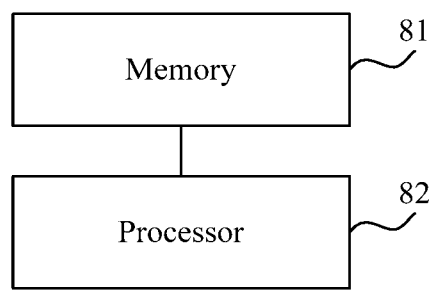
FIG. 8 is a schematic structural diagram of an embodiment of a packet loss detection apparatus according to the present invention.
Figure 9:
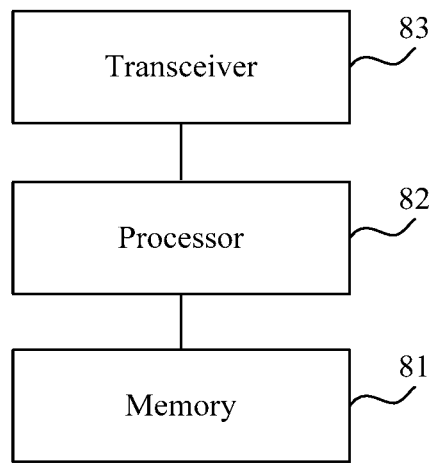
FIG. 9 is a schematic structural diagram of another embodiment of a packet loss detection apparatus according to the present invention.

Packet loss detection apparatuses provided in FIG. 8 and FIG. 9 are corresponding to a packet loss detection method according to the present invention, and are execution devices of the method. The packet loss detection apparatus may be a source node or a destination node in a network, and may also be another node in addition to the source node and the destination node; or may further be a network device in a transport network between the source node and the destination node, and may also be a server independently deployed outside the transport network.

FIG. 8 is a schematic structural diagram of an embodiment of a packet loss detection apparatus according to the present invention. The apparatus provided in this embodiment is corresponding to the method provided in embodiment shown in FIG. 1 to FIG. 5, and the apparatus includes:

a memory 81 and at least one processor 82, where the number of processors 82 is not limited; the apparatus may include only one processor 82, and may also have multiple processors operating collaboratively; and the memory 81 may be integrated with the processor 82, for example, in some user equipments or network devices, the memory is integrated in a chip of the processor; or the memory 81 and the processor 82 may further be components that are disposed independently, for example, in some user equipments or network devices, the memory 81 and the processor 82 may further be connected by using a bus.

The memory 81 is configured to store an instruction; and the at least one processor 82 is configured to run the instruction stored in the memory 81, so as to determine a variation of a packet gap between packets sent from a source node and a packet gap between packets received by a destination node, where the packet gap variation is a variation of an interval, at which the destination node receives a packet, as compared to an interval at which the source node sends a packet; determine intensity of the packet gap variation; and determine, according to the intensity of the packet gap variation, whether transmission congestion occurs between the source node and the destination node.

Optionally, the packet gap variation is a difference between a first gap and a second gap, where the first gap is an gap between time when the destination node receives a first packet and time when the destination node receives a second packet, and the second gap is an gap between time when the source node sends the first packet and time when the source node sends the second packet.

FIG. 9 is a schematic structural diagram of another embodiment of a packet loss detection apparatus according to the present invention. The apparatus provided in this embodiment is corresponding to each method embodiment provided in the present invention, and is an execution device of the method embodiments. As shown in FIG. 9 and on the basis of the apparatus shown in FIG. 8, the apparatus in this embodiment further includes a transceiver 83. It may be understood that in some user equipments or network devices, the transceiver 83 may be a radio frequency device configured to transmit and receive signals; or in some other user equipments or network devices, the transceiver 83 may further be a transceiving interface or the like.

The transceiver 83 is configured to: before the at least one processor 82 determines the variation of the packet gap between the packets sent from the source node and the packet gap between the packets received by the destination node, receive first time information sent from the source node and second time information sent from the destination node, where the first time information includes sending moments when the source node sends the first packet and the second packet, and the second time information includes receiving moments when the destination node receives the first packet and the second packet; or receive first time information and second time information that are sent from the destination node, where the destination node acquires, from the received first packet sent from the source node, a sending moment when the source node sends the first packet, where the sending moment is carried in the first packet; and acquires, from the received second packet sent from the source node, a sending moment when the source node sends the second packet, where the sending moment is carried in the second packet.

Optionally, the at least one processor 82 is specifically configured to run the instruction stored in the memory 81, so as to determine the first gap according to the first time information, and determine the second gap according to the second time information; and determine the packet gap variation according to the first gap and the second gap.

Optionally, the gap variation is a difference between a first transmission delay and a second transmission delay, where the first transmission delay is a delay between a moment when the destination node receives a third packet and a moment when the source node sends the third packet, and the second transmission delay is a delay between a moment when the destination node receives a fourth packet and a moment when the source node sends the fourth packet.

Optionally, the transceiver 83 may further be configured to: before the at least one processor 82 determines the variation of the packet gap between the packets sent from the source node and the packet gap between the packets received by the destination node, receive the first transmission delay and the second transmission delay that are sent from the source node, where the destination node acquires, from the received third packet sent from the source node, a sending moment when the source node sends the third packet, where the sending moment is carried in the third packet; and acquires, from the received fourth packet sent from the source node, a sending moment when the source node sends the fourth packet, where the sending moment is carried in the fourth packet.

Optionally, the at least one processor 82 may be specifically configured to run the instruction stored in the memory 81 so as to determine the packet gap variation according to the first transmission delay and the second transmission delay.

Optionally, the transceiver 83 may further be configured to: before the at least one processor determines the variation of the packet gap between the packets sent from the source node and the packet gap between the packets received by the destination node, receive the packet gap variation sent from the source node.

Optionally, the at least one processor 82 may be specifically configured to run the instruction stored in the memory 81, so as to use an absolute value of a variation value of the packet gap variation, or according to a value of an even exponent of a variation value of the packet gap variation, as a discriminant value of the intensity of the packet gap variation.

Optionally, after determining the intensity of the packet gap variation, the at least one processor 82 is further configured to run the instruction stored in the memory 81, so as to perform filtering on the obtained discriminant value of the intensity according to $PGVT_i = (1-\alpha)*PGVT_{i-1} + \alpha*\Delta PG_i^2$, and obtain a filtered discriminant value of the intensity, where $PGVT_i$ is the filtered discriminant value of the intensity; $PG_i$ is a variation value, obtained at a current time, of the packet gap variation; $PGVT_{i-1}$ is a discriminant value, obtained at a previous time, of the intensity; and $\Delta PG_i^2$ is a square of the packet gap variation obtained at the current time.

Optionally, the at least one processor 82 may be specifically configured to run the instruction stored in the memory 81, and if the discriminant value of the intensity is greater than or equal to a set threshold, determine that transmission congestion occurs between the source node and the destination node; or if the discriminant value of the intensity is less than a set threshold, determine that transmission congestion does not occur between the source node and the destination node.

Optionally, after determining, according to the intensity of the packet gap variation, whether transmission congestion occurs between the source node and the destination node, the at least one processor 82 is further configured to run the instruction stored in the memory 81, and in multiple times, which include a current time, of transmission congestion determining, if a determined probability of transmission congestion is greater than or equal to a set probability, finally determine that transmission congestion occurs between the source node and the destination node; or if a determined probability of transmission congestion is less than a set probability, finally determine that transmission congestion does not occur between the source node and the destination node.

For a specific process and effects of the packet loss detection method performed by the packet loss detection apparatus provided in FIG. 8 and FIG. 9, refer to related descriptions in each method embodiment in the present invention. Details are not described herein again.

An embodiment of a packet loss detection system is further provided in the present invention, and the system includes a source node, a destination node, and a packet loss detection apparatus.

Optionally, the packet loss detection apparatus is the source node, the destination node, a device in a transport network between the source node and the destination node, or a device outside the transport network.

An architecture of the system may be any one of architectures shown in FIG. 2 to FIG. 5. For a structure of the packet loss detection apparatus, refer to the embodiments shown in FIG. 6 to FIG. 9. For a specific process and effects of performing the packet loss detection method by the apparatus, refer to related descriptions in each method embodiment. Details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A packet loss detection method, comprising:
  a.) determining a packet gap variation being a difference between a first gap and a second gap, wherein the first gap is a gap between a time when a destination node receives a first packet and a time when the destination node receives a second packet; and the second gap is a gap between a time when a source node sends the first packet and a time when the source node sends the second packet;
  b.) determining an intensity of the packet gap variation;
  c.) determining, according to the intensity of the packet gap variation, whether transmission congestion occurs between the source node and the destination node; and
  d.) after performing steps a.)-c.), multiple times, determining a probability of transmission congestion based on the results of the determinations of step c.), wherein if the determined probability of transmission congestion is greater than or equal to a set probability, finally determining that transmission congestion occurs between the source node and the destination node, and wherein if the determined probability of transmission congestion is less than the set probability, finally determining that transmission congestion does not occur between the source node and the destination node.

2. The method according to claim 1, wherein before the determining the variation of the packet gap between packets sent from a source node and a packet gap between packets received by the destination node, the method further comprises:
  receiving first time information sent from the source node and second time information sent from the destination node, wherein the first time information comprises sending moments when the source node sends the first packet and the second packet, and the second time information comprises receiving moments when the destination node receives the first packet and the second packet; or
  receiving first time information and second time information that are sent from the destination node, wherein the destination node acquires, from the received first packet sent from the source node, a first sending moment when the source node sends the first packet, wherein the first sending moment is carried in the first packet; and wherein the destination node acquires, from the received second packet sent from the source node, a second sending moment when the source node sends the second packet, wherein the second sending moment is carried in the second packet.

3. The method according to claim 2, wherein the determining the variation of the packet gap between packets sent from the source node and the packet gap between packets received by the destination node comprises:
  determining the first gap according to the first time information, and determining the second gap according to the second time information; and
  determining the packet gap variation according to the first gap and the second gap.

4. The method according to claim 1, wherein the determining a variation of a packet gap between packets sent from a source node and a packet gap between packets received by a destination node comprises:
  determining the packet gap variation according to the first transmission delay and the second transmission delay.

5. The method according to claim 1, wherein before the determining a variation of a packet gap between packets sent from a source node and a packet gap between packets received by a destination node, the method further comprises:
  receiving the packet gap variation sent from the source node.

6. The method according to claim 1, wherein the determining an intensity of the packet gap variation comprises:
  using an absolute value of a variation value of the packet gap variation, or using a value of an even exponent of a variation value of the packet gap variation, as a discriminant value of the intensity of the packet gap variation.

7. The method according to claim 6, wherein after the determining an intensity of the packet gap variation, the method further comprises:
  performing filtering on the discriminant value of the intensity according to $PGVT_i=(1-\alpha)*PGVT_{i-1}+\alpha*\Delta PG_i^2$, and obtaining a filtered discriminant value of the intensity, wherein $PGVT_i$ is the filtered discriminant value of the intensity; $PG_i$ is a variation value, obtained at a current time, of the packet gap variation; $PGVT_{i-1}$ is a discriminant value, obtained at a previous time, of the intensity; and $\Delta PG_i^2$ is a square of the packet gap variation obtained at the current time.

8. The method according to claim 7, wherein the determining, according to the intensity of the packet gap variation, whether transmission congestion occurs between the source node and the destination node comprises:
  if the discriminant value of the intensity is greater than or equal to a set threshold, determining that transmission congestion occurs between the source node and the destination node; or
  if the discriminant value of the intensity is less than the set threshold, determining that transmission congestion does not occur between the source node and the destination node.

9. The method according to claim 8, wherein after the determining, according to the intensity of the packet gap variation, whether transmission congestion occurs between the source node and the destination node, the method further comprises:
  in multiple times, which comprise a current time, of transmission congestion determining, if a determined probability of transmission congestion is greater than or equal to a set probability, finally determining that transmission congestion occurs between the source node and the destination node;

or, if the determined probability of transmission congestion is less than the set probability, finally determining that transmission congestion does not occur between the source node and the destination node.

10. A packet loss detection apparatus, comprising a memory and at least one processor, wherein:

the memory is configured to store an instruction; and the at least one processor is configured to execute the instruction stored in the memory, wherein execution of the instruction causes the at least one processor to:

a.) determine a packet gap variation being a difference between a first gap and a second gap, wherein the first gap is a gap between a time when a destination node receives a first packet and a time when the destination node receives a second packet; and the second gap is a gap between a time when a source node sends the first packet and a time when the source node sends the second packet;

b.) determine an intensity of the packet gap variation;

c.) determine, according to the intensity of the packet gap variation, whether transmission congestion occurs between the source node and the destination node; and d.) after performing steps a.)-c.), multiple times, determine a probability of transmission congestion based on the results of the determinations of step c.), wherein if the determined probability of transmission congestion is greater than or equal to a set probability, finally determining that transmission congestion occurs between the source node and the destination node, and wherein if the determined probability of transmission congestion is less than the set probability, finally determining that transmission congestion does not occur between the source node and the destination node.

11. The apparatus according to claim 10, further comprising:

a transceiver, configured to: before the at least one processor determines the variation of the packet gap between the packets sent from the source node and the packet gap between the packets received by the destination node, receive first time information sent from the source node and second time information sent from the destination node, wherein the first time information comprises sending moments when the source node sends the first packet and the second packet, and the second time information comprises receiving moments when the destination node receives the first packet and the second packet; or receive first time information and second time information that are sent from the destination node, wherein the destination node acquires, from the received first packet sent from the source node, a first sending moment when the source node sends the first packet, wherein the first sending moment is carried in the first packet; and wherein the destination node acquires, from the received second packet sent from the source node, a second sending moment when the source node sends the second packet, wherein the second sending moment is carried in the second packet.

12. The apparatus according to claim 11, wherein execution of the instruction further causes the at least one processor to determine the first gap according to the first time information, and determine the second gap according to the second time information; and determine the packet gap variation according to the first gap and the second gap.

13. The apparatus according to claim 10, wherein execution of the instruction further causes the at least one processor to determine the packet gap variation according to the first transmission delay and the second transmission delay.

14. The apparatus according to claim 10, wherein the transceiver is further configured to: before the at least one processor determines the variation of the packet gap between the packets sent from the source node and the packet gap between the packet received by the destination node, receive the packet gap variation sent from the source node.

15. The apparatus according to claim 10, wherein execution of the instruction further causes the at least one processor to use an absolute value of a variation value of the packet gap variation, or to use a value of an even exponent of a variation value of the packet gap variation, as a discriminant value of the intensity of the packet gap variation.

16. The apparatus according to claim 15, wherein after determining the intensity of the packet gap variation, execution of the instruction further causes the at least one processor to perform filtering on the discriminant value of the intensity according to $PGVT_i=(1-\alpha)*PGVT_{i-1}+\alpha*\Delta PG_i^2$, and obtain a filtered discriminant value of the intensity, wherein $PGVT_i$ is the filtered discriminant value of the intensity; $PG_i$ is a variation value, obtained at a current time, of the packet gap variation $PGVT_{i-1}$ is a discriminant value, obtained at a previous time, of the intensity; and $\Delta PG_i^2$ is a square of the packet gap variation obtained at the current time.

17. The apparatus according to claim 15, wherein execution of the instruction further causes the at least one processor to: if the discriminant value of the intensity is greater than or equal to a set threshold, determine that transmission congestion occurs between the source node and the destination node; or if the discriminant value of the intensity is less than the set threshold, determine that transmission congestion does not occur between the source node and the destination node.

18. The apparatus according to claim 17, wherein after determining, according to the intensity of the packet gap variation, whether transmission congestion occurs between the source node and the destination node, execution of the instruction further causes the at least one processor to: in multiple times, which comprise a current time, of transmission congestion determining, if a determined probability of transmission congestion is greater than or equal to a set probability, finally determine that transmission congestion occurs between the source node and the destination node;

or, if the determined probability of transmission congestion is less than the set probability, finally determine that transmission congestion does not occur between the source node and the destination node.

19. A packet loss detection system, comprising a source node, a destination node, and a packet loss detection apparatus comprising a memory and at least one processor, wherein:

the memory is configured to store an instruction; and the at least one processor is configured to execute the instruction stored in the memory, wherein execution of the instruction causes the at least one processor to:

a.) determine a packet gap variation being a difference between a first gap and a second gap, wherein the first gap is a gap between a time when a destination node receives a first packet and a time when the destination node receives a second packet; and the second gap is a gap between a time when a source node sends the first packet and a time when the source node sends the second packet;
b.) determine an intensity of the packet gap variation;
c.) determine, according to the intensity of the packet gap variation, whether transmission congestion occurs between the source node and the destination node; and
d.) after performing steps a.)-c.), multiple times, determine a probability of transmission congestion based on the results of the determinations of step c.), wherein if the determined probability of transmission congestion is greater than or equal to a set probability, finally determining that transmission congestion occurs between the source node and the destination node, and wherein if the determined probability of transmission congestion is less than the set probability, finally determining that transmission congestion does not occur between the source node and the destination node.

20. The system according to claim 19, wherein the packet loss detection apparatus is the source node, the destination node, a device in a transport network between the source node and the destination node, or a device outside the transport network.

* * * * *